(12) United States Patent
Kim et al.

(10) Patent No.: US 10,671,645 B2
(45) Date of Patent: Jun. 2, 2020

(54) REAL TIME EXPERIENCE ANALYZING SYSTEM AND METHOD

(71) Applicant: RESEARCH & BUSINESS FOUNDATION SUNGKYUNKWAN UNIVERSITY, Suwon-si (KR)

(72) Inventors: Yong Se Kim, Seoul (KR); Yeon Koo Hong, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 1065 days.

(21) Appl. No.: 14/401,350

(22) PCT Filed: May 14, 2013

(86) PCT No.: PCT/KR2013/004279
§ 371 (c)(1),
(2) Date: Apr. 9, 2015

(87) PCT Pub. No.: WO2013/172639
PCT Pub. Date: Nov. 21, 2013

(65) Prior Publication Data
US 2015/0220616 A1     Aug. 6, 2015

Related U.S. Application Data

(60) Provisional application No. 61/646,425, filed on May 14, 2012.

(30) Foreign Application Priority Data

Jul. 5, 2012   (KR) .......................... 10-2012-0073381

(51) Int. Cl.
*G06F 16/28*     (2019.01)
*G06F 16/951*    (2019.01)

(52) U.S. Cl.
CPC .......... *G06F 16/285* (2019.01); *G06F 16/951* (2019.01)

(58) Field of Classification Search
CPC ......... G06F 17/30598; G06F 17/30864; G06F 17/30554; G06F 17/30867
(Continued)

(56) References Cited

U.S. PATENT DOCUMENTS 6,915,234 B2 *   7/2005   Curtin ................... G06Q 30/02
                                                  702/182
2006/0200480 A1*  9/2006  Harris .............. G06F 17/30876
(Continued)

FOREIGN PATENT DOCUMENTS

JP    2001-44994 A     2/2001
JP    2003-256606 A    9/2003
(Continued)

OTHER PUBLICATIONS

International Search Report dated Aug. 13, 2013 in corresponding International Patent Application No. PCT/KR2013/004279 (4 pages, in Korean with English Translation).

*Primary Examiner* — Hosain T Alam
*Assistant Examiner* — Nicholas E Allen
(74) *Attorney, Agent, or Firm* — NSIP Law

(57) ABSTRACT

There is provided a real-time experience analyzing method for enabling an experience analyzing server to analyze user's experience of an evaluation target service or an evaluation target product in real time. The method comprising transmitting query data including an experience evaluation indicator for the evaluation target service or the evaluation target product to a terminal of the user; receiving reply data input by the user through the terminal in response to the query data; and generating evaluation result data for the evaluation target service or the evaluation target product (Continued)

based on the reply data. The transmitting of the query data transmits the query data by a series of detailed behaviors consisting of the evaluation target service or the evaluation target product, and the generating of the evaluation result data generates evaluation result data based on the reply data received by the detailed behaviors or the detailed features.

22 Claims, 14 Drawing Sheets

(58) Field of Classification Search
USPC .......................................................... 707/722
See application file for complete search history.

(56) References Cited

U.S. PATENT DOCUMENTS

| | | | | |
|---|---|---|---|---|
| 2008/0092060 | A1* | 4/2008 | Berg | G06F 17/3089 715/748 |
| 2008/0214162 | A1* | 9/2008 | Ramer | G06F 17/30749 455/414.2 |
| 2008/0288276 | A1* | 11/2008 | Harris | G06Q 30/02 705/7.32 |
| 2010/0023377 | A1* | 1/2010 | Sheridan | G06Q 10/10 705/7.32 |
| 2010/0057562 | A1* | 3/2010 | Gabbay | G06Q 30/02 705/14.52 |
| 2010/0137693 | A1* | 6/2010 | Porras | A61M 1/16 600/301 |
| 2010/0138024 | A1* | 6/2010 | Bouvier | A23G 1/30 700/104 |
| 2010/0185564 | A1* | 7/2010 | King | G06Q 90/00 705/500 |
| 2010/0185641 | A1* | 7/2010 | Brazier | G06Q 30/02 707/758 |
| 2010/0228602 | A1* | 9/2010 | Gilvar | G06Q 30/0252 705/14.5 |
| 2010/0257028 | A1* | 10/2010 | Hillerbrand | G06Q 10/067 705/319 |
| 2010/0281355 | A1* | 11/2010 | White | G06Q 30/02 715/222 |
| 2011/0055197 | A1* | 3/2011 | Chavan | G06F 17/3046 707/713 |
| 2011/0112860 | A1* | 5/2011 | Kehr | G06F 19/3456 705/2 |
| 2011/0184781 | A1* | 7/2011 | Hussam | G06Q 10/10 705/7.32 |
| 2011/0191364 | A1* | 8/2011 | LeBeau | G06F 17/30672 707/767 |
| 2011/0206198 | A1* | 8/2011 | Freedman | G06Q 30/06 379/265.03 |
| 2011/0209065 | A1* | 8/2011 | Del Rio | G06F 19/363 715/733 |
| 2011/0276513 | A1* | 11/2011 | Erhart | G06F 17/30539 705/347 |
| 2012/0011006 | A1* | 1/2012 | Schultz | G06Q 10/10 705/14.73 |
| 2012/0124559 | A1* | 5/2012 | Kondur | G06F 8/41 717/125 |
| 2012/0131103 | A1* | 5/2012 | Fox | H04L 67/306 709/204 |
| 2012/0151310 | A1* | 6/2012 | El-kalliny | G06F 17/30867 715/205 |
| 2012/0166218 | A1* | 6/2012 | Reiner | G06F 19/327 705/2 |
| 2012/0232954 | A1* | 9/2012 | Calman | G06Q 10/00 705/7.32 |
| 2013/0014137 | A1* | 1/2013 | Bhatia | H04N 21/252 725/9 |
| 2013/0018916 | A1* | 1/2013 | Busch | G06F 17/30622 707/771 |
| 2013/0031208 | A1* | 1/2013 | Linton | G09B 7/02 709/217 |
| 2013/0096985 | A1* | 4/2013 | Robinson | G06Q 30/0203 705/7.32 |
| 2013/0191904 | A1* | 7/2013 | Piliouras | H04L 67/02 726/7 |
| 2013/0304758 | A1* | 11/2013 | Gruber | G06F 17/30976 707/769 |
| 2014/0067834 | A1* | 3/2014 | Hutten | H04L 41/5067 707/754 |
| 2014/0082055 | A1* | 3/2014 | Achan, Jr. | H04L 67/22 709/203 |
| 2014/0229614 | A1* | 8/2014 | Aggarwal | H04M 3/2227 709/224 |
| 2014/0278788 | A1* | 9/2014 | Du | G06Q 30/0203 705/7.32 |
| 2014/0310062 | A1* | 10/2014 | Klein | G06Q 30/0203 705/7.32 |
| 2014/0324541 | A1* | 10/2014 | Malik | G06Q 30/0203 705/7.32 |
| 2015/0051954 | A1* | 2/2015 | Pullin | G06Q 10/0639 705/7.34 |
| 2015/0064668 | A1* | 3/2015 | Manci | G06Q 10/0639 434/219 |
| 2015/0081906 | A1* | 3/2015 | Backholm | H04W 74/06 709/225 |
| 2015/0089399 | A1* | 3/2015 | Megill | H04L 12/1813 715/753 |

FOREIGN PATENT DOCUMENTS

KR    10-2006-0127605 A    12/2006
KR    10-2011-0086411 A    7/2011

* cited by examiner

REAL TIME EXPERIENCE ANALYZING SYSTEM AND METHOD

CROSS-REFERENCE TO RELATED APPLICATION

This application is an U.S. national phase application under 35 U.S.C. § 371 of International Application No. PCT/KR2013/004279 filed on May 14, 2013, claiming the priority based on Korean Patent Application No. 10-2012-0073381 filed on Jul. 5, 2012 and U.S. Patent Application No. 61/646,425 filed on May 14, 2012, the entire disclosures of which are incorporated herein by reference for all purposes.

FIELD

The embodiments described herein pertain generally to a system and a method for analyzing experience in real time, and in particular, a real-time experience analyzing server, a user experience processing terminal device, and a real-time experience analyzing method.

DESCRIPTION OF RELATED ART

Information processing procedures for obtaining user's experience information according to conventional technologies have simply provided a query to a user and merely generated experience sampling data depending on a reply to the query. Korean Patent Application Publication No. 10-2006-0127605 (Title of Invention: Service Quality Evaluation/Search System and Method Based on Customer's Service Experience) describes this method.

However, the information processing procedures did not implement a context-based experience information processing procedure, which systemically reviews user's situation, prior to user's experience. Specifically, there has been a problem of low reliability in relevant queries used when generating the experience sampling data, sampling procedures, and obtained results. Further, the conventional information processing procedures have had restrictions of time and space in sampling user's experience.

Meanwhile, a conventional service journey map has schematized customer's experience by service stages with cross-sectional qualitative or quantitative expressions. This service journey map has still stayed at the degree of simply identifying customers' experience within a service process. Further, since the customer journey map generally uses a restrospective experience material, there has been a limit in collecting data, in real time, for the moment that a user actually experiences a certain situation.

Accordingly, it is necessary to combine an evaluation system in a subjective or experience aspect of customers and participating stakeholders to a service blueprint essentially consisting of functions or behaviors.

SUMMARY

In view of the foregoing problems, example embodiments provide a real-time experience analyzing system and method, which analyze and schematize a service process or product from multifaceted experience perspectives including participants' emotional experience, as well as functional and behavioral perspectives.

In addition, some example embodiments provide a real-time experience analyzing system, which is capable of generating, in real time, evaluation result data reflecting experience from the position of a provider as well as a customer with respect to a service or product, and immediately identifying the generated evaluation result data.

In accordance with an example embodiment, there is provided a real-time experience analyzing method for enabling an experience analyzing server to analyze user's experience of an evaluation target service or an evaluation target product in real time, the method comprising: transmitting query data including an experience evaluation indicator for the evaluation target service or the evaluation target product to a terminal device of the user; receiving, from the terminal device, reply data input by the user through the terminal device in response to the query data; and generating evaluation result data for the evaluation target service or the evaluation target product based on the reply data. Herein, the transmitting of the query data transmits the query data by a series of detailed behaviors consisting of the evaluation target service or detailed features consisting of the evaluation target product, and the generating of the evaluation result data generates evaluation result data based on the reply data received by the detailed behaviors or the detailed features.

In accordance with another example embodiment, there is provided a real-time experience analyzing server for analyzing experience of an evaluation target service or an evaluation target product in real time, the server comprising: a transmitting and receiving unit that transmits query data including an experience evaluation indicator for the evaluation target service or the evaluation target product to a terminal device of a user, and receives, from the terminal device, reply data input by the user through the terminal device in response to the query data; and a data processing unit that generates evaluation result data for the evaluation target service or the evaluation target product based on the reply data. Herein, the transmitting and receiving unit transmits the query data by a series of detailed behaviors constituting the evaluation target service or detailed features consisting the evaluation target product, and the data processing unit generates evaluation result data based on the reply data received by the detailed behaviors or the detailed features.

In accordance with still another example embodiment, there is provided a real-time experience processing device for processing user's experience of an evaluation target service or an evaluation target product, comprising: a receiving unit that receives query data including an experience evaluation indicator for the evaluation target service or the evaluation target product from a real-time experience analyzing server; a transmitting unit that transmits reply data input by the user in response to the query data to the real-time experience analyzing server; and a data outputting unit that outputs evaluation result data for the evaluation target service or the evaluation target product, which have been received from the real-time experience analyzing server through the receiving unit. Herein, the transmitting unit transmits the reply data by a series of detailed behaviors constituting the evaluation target service or detailed features constituting the evaluation target product, and the data outputting unit outputs the evaluation result data generated by the real-time experience analyzing server based on the reply data transmitted by the detailed behaviors or the detailed features.

In accordance with the example embodiments, by quantifying subjective and experiential indicators of various relevant interested parties including customers and providers with respect to a service process or product according to certain criteria, it is possible to objectively realize behavioral and emotional perspectives that users experience in actual situations.

Further, beyond process analysis focusing on a function, it is possible to analyze and schematize, in real time, user's multifaceted experience with respect to a series of detailed behaviors constituting an evaluation target service or detailed features constituting an evaluation target product.

Further, since the real-time experience analyzing server, which is one of the technical means of the example embodiments to solve the conventional problems, generates evaluation result data based on reply data optimally reflecting user's experience, it has an advantage in that it is possible to provide evaluation result data generated in various fields such as consumer research, experience design research, and service design research.

Further, as the user experience processing terminal device, which is one of the technical means of the example embodiments to solve the conventional problem, is a means to suggest opinion on a certain evaluation target service or a certain evaluation target product and identify analyzed evaluation results, a user can effectively analyze the corresponding service, by separately outputting provider evaluation result data and consumer evaluation result data, which are generated in the real-time experience analyzing server.

Additionally, by selecting an experience evaluation indicator based on input data collected in advance in a multiple number of terminal devices, it is possible to generate a high-reliability query or questionnaire capable of more exactly reflecting service evaluators' experience than the conventional method.

DETAILED DESCRIPTION

Figure 1:
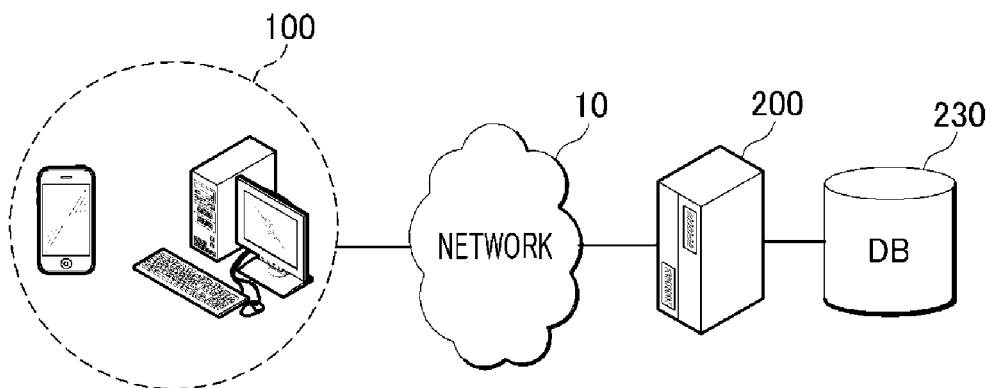
FIG. 1 is a configuration view showing a real-time experience analyzing system in accordance with an example embodiment.

Hereinafter, example embodiments will be described in detail with reference to the accompanying drawings so that inventive concept may be readily implemented by those skilled in the art. However, it is to be noted that the present disclosure is not limited to the example embodiments, but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. Further, the term "comprises or includes" and/or "comprising or including" means that one or more other components, steps, operations, and/or the existence or addition of elements are not excluded in addition to the described components, steps, operations and/or elements.

FIG. 1 is a configuration view showing a real-time experience analyzing system in accordance with an example embodiment.

First, with reference to FIG. 1, the real-time experience analyzing system includes a user experience processing terminal device 100 and a real-time experience analyzing server 200. These components may be connected to each other through a network 10, and the real-time experience analyzing server 200 may be connected to a separate database 230 capable of storing and managing an enormous amount of data.

In this case, the network 10 may be realized as a wired network such as a local area network (LAN), a wide area network (WAN) or a value added network (VAN), or any type of a wireless network such as a mobile radio communication network or a satellite communication network.

The user experience processing terminal device 100 may be realized as a computer or a mobile device that can be accessed to a remote server through the network 10. Here, the computer may include any type of a handheld-based wireless communication device such as a personal communication system (PCS), a global system for mobile communication (GSM), a personal digital cellular (PDC), a personal handyphone system (PHS), a personal digital assistant (PDA), international mobile telecommunication (IMT)-2000, code division multiple access (CDMA)-2000, W-code division multiple access (W-CDMA), a wireless broadband Internet (WiBro) terminal device, a smart phone and so on.

The real-time experience analyzing server 200 receives user's experience information from the user experience processing terminal device 100, classifies the received experience information to generate query data, and provides the generated query data to the user experience processing terminal device 100. In addition, the real-time experience analyzing server 200 may implement user's experience sampling and analyze the user's experience information, based on reply data received from the user experience processing terminal device 100 and video/audio data associated with the reply data. The data that have been analyzed through the above-described processes may be used for consumer research, marketing research and others.

The database 230 may be configured by a database management system (DBMS) for transmitting/receiving and storing data, and provided in the inside of the above-described real-time experience analyzing server 200 or realized as a separate device to conduct communication.

In addition, the certain evaluation target service may be in the form whereby two (2) or more interested parties can mutually exchange a service, and a type of the service is not specifically limited. For example, the service may mean any one of various types of services such as a medical service, a communication service, a delivery service, a food service, an education service, and a transportation service.

In addition, the certain evaluation target product may mean any one of various types of products such as an electronic product, a machine product, an electronic machine product, a stationery product, a doll product, a sports equipment product, an accessory product, a kitchen product, a bathroom product and a furniture product.

Hereinafter, detailed configuration of the user experience processing terminal device 100 and the real-time experience analyzing server 200 is described with reference to FIG. 2 and FIG. 6.

Figure 2:
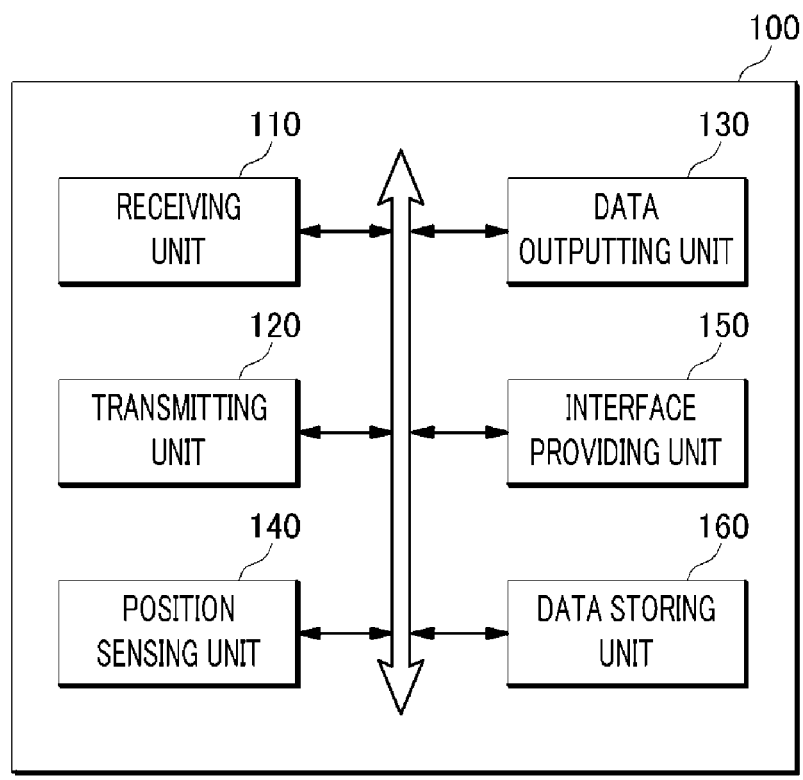
FIG. 2 is a block diagram showing a user experience processing terminal device in accordance with an example embodiment.

FIG. 2 is a block diagram showing the user experience processing terminal device in accordance with an example embodiment.

The terminal device 100, which processes user's experience of the certain evaluation target service and the certain evaluation target product, as suggested in the example embodiments includes a receiving unit 110, a transmitting unit 120, a data outputting unit 130, a progress sensing unit 140, an interface providing unit 150 and a data storing unit 160, and transmits and receives various data with the real-time experience analyzing server 200. In this case, the terminal device 100 may be a personal terminal as described above or a public terminal provided for unspecified individuals in a space for the certain evaluation target service and the certain evaluation target product.

The receiving unit 110 receives query data including an experience evaluation indicator for the certain evaluation target service or the certain evaluation target product from the real-time experience analyzing server 200, and evaluation result data for the evaluation target service or the evaluation target product, which will be described later. In this case, the query data may include at least one experience valuation indicator pre-set to effectively evaluate the certain evaluation target service or the certain evaluation target product, and such an experience evaluation indicator will be described later.

The transmitting unit 120 transmits reply data input by a user in response to the query data to the real-time experience analyzing server 200. Especially, the transmitting unit 120 transmits the reply data by a series of detailed behaviors constituting the certain evaluation target service or detailed features constituting the certain evaluation target product. That is, a user may input the reply data, which is a kind of feedback, by using UI provided through a screen of the user experience processing terminal device 100, and the UI may be provided by the interface providing unit 150 or an installed dedicated application.

The reply data may be variously generated reflecting at least one of the following: a type of the certain evaluation target service (medicine, communication, delivery and education, etc.), a subject evaluating the certain evaluation target service (a customer, a provider or an interested party), timing that reply data are input (time information, weather information, information of humidity in a space for the service, and information of a temperature in a space of the service, etc.), a position of a space for the certain evaluation target service (coordinate values, etc.), the interior of a space for the certain evaluation target service (design and interior color information, etc.), the number of individuals present in a space for the certain evaluation target service (the number of waiting persons, and the number of persons for providing the service, etc.), and time necessary for the certain evaluation target service (waiting time and service providing time, etc.). Additionally, for the certain evaluation target product as well, the reply data may be variously generated reflecting criteria identical or similar to those described above.

In addition, the transmitting unit 120 may transmit first reply data generated when a user is a provider of the evaluation target service or the evaluation target product, to the real-time experience analyzing server 200, and transmit second reply data generated when a user is a customer of the evaluation target service or the evaluation target product, to the real-time experience analyzing server 200. That is, the transmitting unit 120 may transmit reply data discriminated depending on who is a user, to the real-time experience analyzing server 200.

The data outputting unit 130 outputs the evaluation result data for the evaluation target service or the evaluation target product that have been received from the real-time experience analyzing server 200 through the above-described receiving unit 110. Especially, the data outputting unit 130 outputs the evaluation result data generated in the real-time experience analyzing server 200 based on the reply data transmitted by the detailed behaviors or the detailed features.

Figure 3A:
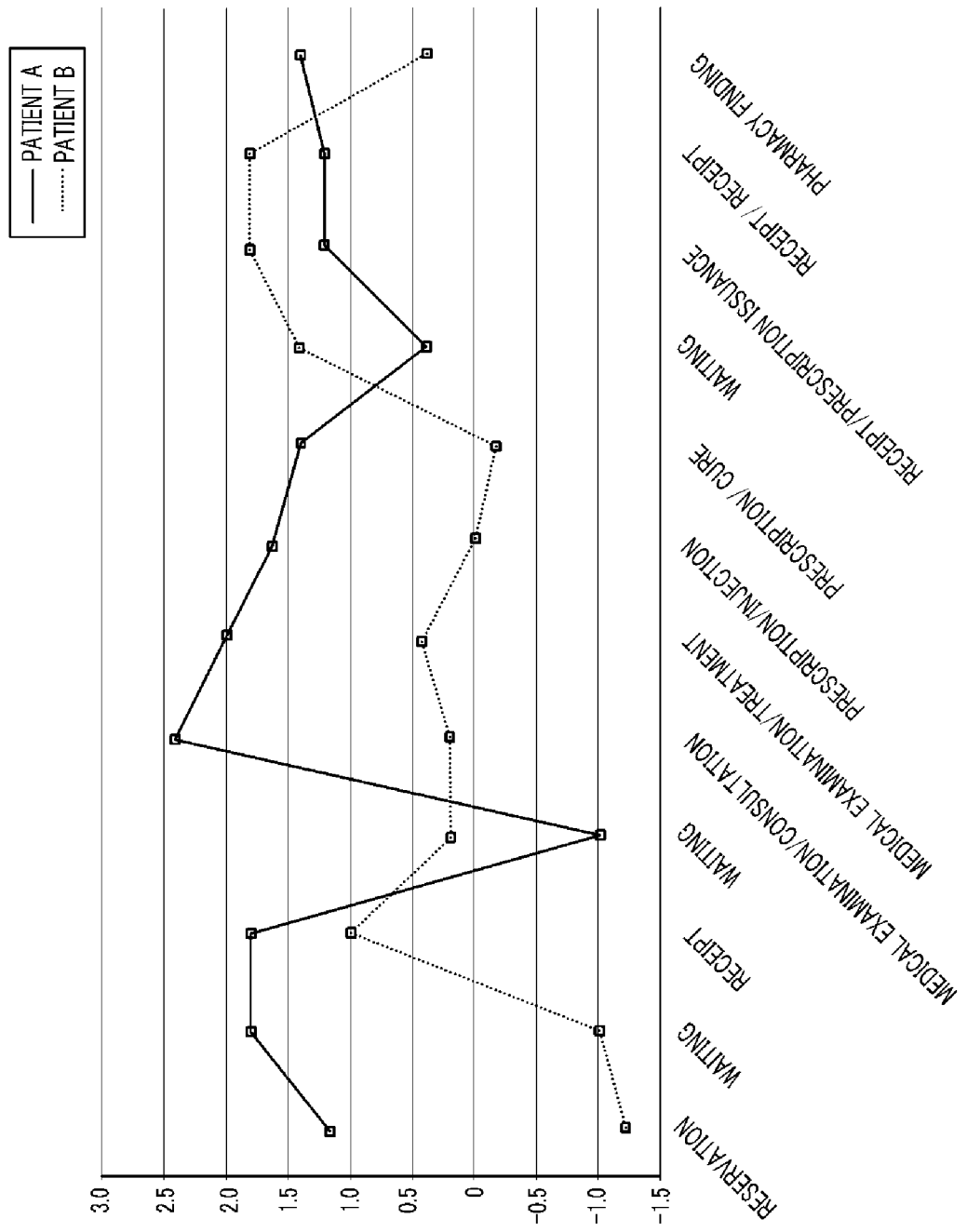
FIG. 3A and FIG. 3B show an example for schematizing an experience journey map by the real-time experience analyzing system in accordance with an example embodiment.
Figure 3B:
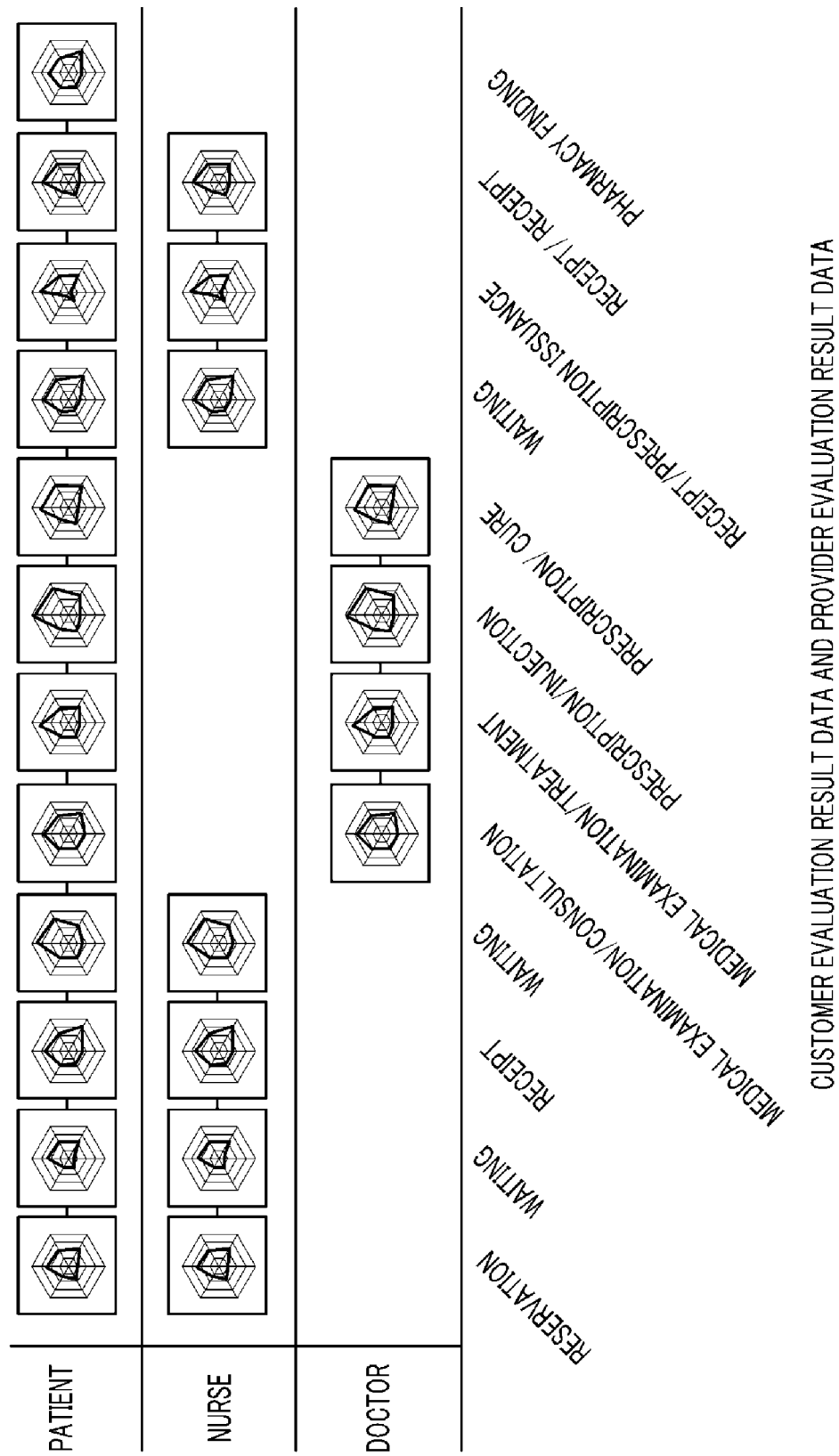

Each of FIG. 3A and FIG. 3B shows an example for schematizing an experience journey map by the real-time experience analyzing system in accordance with an example embodiment. For reference, various examples described hereinafter are related to the evaluation target service, and it can be easily understood that the examples may be also identically or similarly applied to the evaluation target product.

For example, when the certain evaluation target service is a service within a hospital, the certain evaluation target service may consist of a series of detailed behaviors such as reservation, first waiting, reception, second waiting, medical examination/consultation, medical examination/treatment, prescription/injection, prescription/caring, third waiting, prescription issuance, payment, and pharmacy finding.

A user may input reply data to query data by the series of detailed behaviors constituting the service within the hospital through the terminal device 100, and identify, in real time, evaluation result data for the service within the hospital that have been generated by the real-time experience analyzing server 200 based on the reply data. In this case, the user may be a multiple number of patients as shown in FIG. 3A, and a patient, a nurse, and a doctor as shown in FIG. 3B. That is, FIG. 3A shows the evaluation result data for the service within the hospital when viewed from the patient's perspective, and FIG. 3B shows the evaluation result data for the service within the hospital when viewed from the customer's and provider's perspectives. Each of the reply data may be processed with a score, and the score may be converted having a preset weighting to be used as a base material for generation of the evaluation result data.

As described, the data outputting unit 130 may output the evaluation result data for the certain evaluation target service or the certain evaluation target product in various forms through the screen of the user experience processing terminal device 100, and a user may immediately identify the output evaluation result data. More specifically, the various forms that can be output are described hereinafter, but are not limited to such examples.

In accordance with an example embodiment, the data outputting unit 130 may output an average value and standard deviation data for user's evaluation results regarding each experience evaluation indicator within the evaluation result data.

In accordance with another example embodiment, the data outputting unit 130 may output detailed evaluation result data for each experience evaluation indicator according to sequential flow of the detailed behaviors or correlation of the detailed features within the evaluation result data by the detailed behaviors or the detailed features. In this case, the detailed evaluation result data may be displayed in the Spider Map manner that they are present by connected lines according to preset criteria or the Color Code manner that they have difference in color according to preset criteria, as shown in FIG. 3B.

In accordance with still another example embodiment, as described above, the data outputting unit 130 may discriminate and output the provider evaluation result data generated based on the first reply data, and the customer evaluation result data generated based on the second reply data. That is, as shown in FIG. 3B, a user may identify each of the customer evaluation result data and the provider evaluation result data for the service within the hospital through the screen of the terminal device 100. Here, the descriptions above have been provided from the customer's and provider's perspectives, but it is also possible to discriminate and output the evaluation result data for interested parties, and not a customer and a provider.

Figure 4:
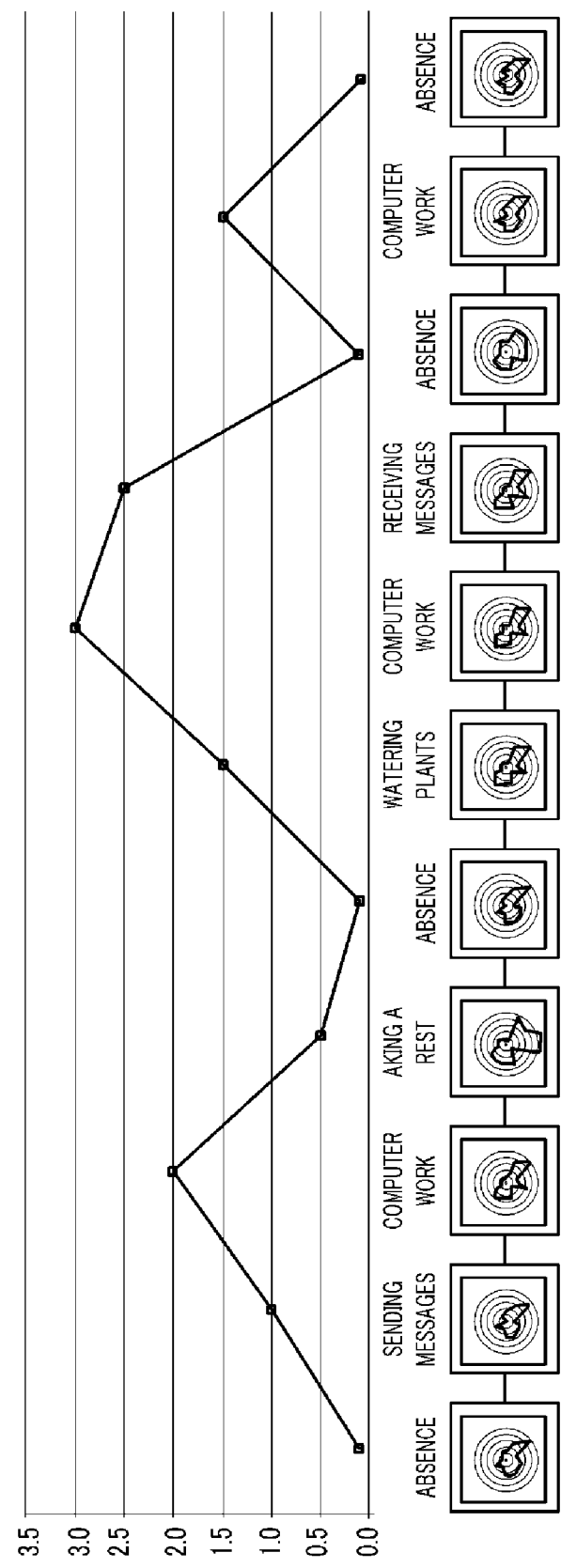
FIG. 4 shows another example for schematizing an experience journey map by the real-time experience analyzing system in accordance with an example embodiment.

Additionally, the evaluation target service described in the example embodiments may include a broader concept of service as shown in FIG. 4, as well as the mutual service described above. FIG. 4 shows another example for schematizing an experience journey map by the real-time experience analyzing system in accordance with an example embodiment.

That is, the certain evaluation target service may relate to an indirect service like satisfaction in working as shown in FIG. 4. In this case, the certain evaluation target service may consist of a series of detailed behaviors such as first absence, sending messages, first computer work, taking a rest, second absence, watering plants, second computer work, receiving messages, third absence, third computer work, and fourth absence. Evaluation result data for the behaviors may be simultaneously displayed by an average value and the Spider Map method through the screen as shown in FIG. 4.

Returning to FIG. 2, the progress sensing unit 140 senses progress information including user's position information within the space where the evaluation target service is performed. The above-described transmitting unit 120 may transmit the progress information delivered from the progress sensing unit 140 to the real-time experience analyzing server 200 per detailed behavior. The progress sensing unit 140 may be realized including GPS, configuration capable of exactly sensing a position even in an indoor area according to development of technologies and others.

Figure 5:
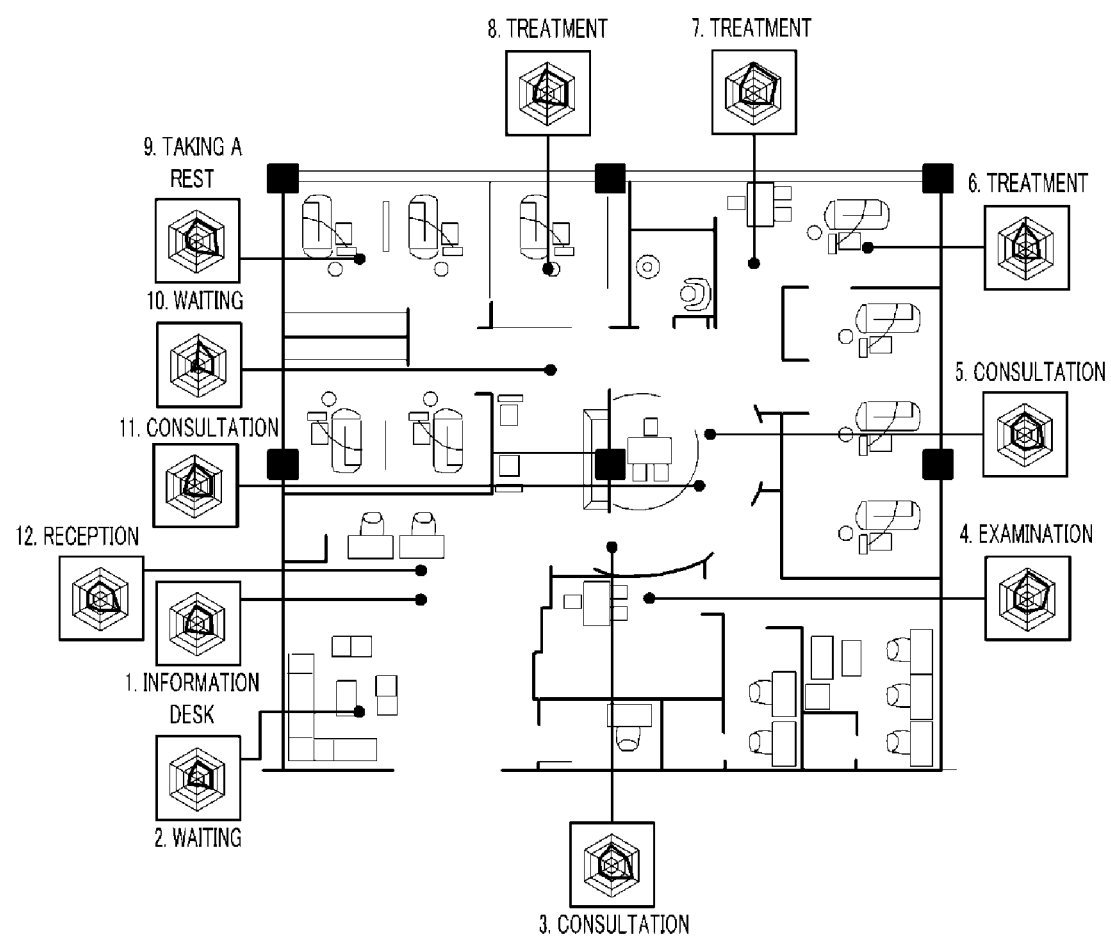
FIG. 5 shows an example for schematizing an experience journey map by the real-time experience analyzing system in a space where an evaluation target service is performed, in accordance with an example embodiment.

FIG. 5 shows an example for schematizing the experience journey map by the real-time experience analyzing system in accordance with an example embodiment in the space where the evaluation target service is performed. The data outputting unit 130 may output the evaluation result data for the service within the hospital in a plane figure of the hospital in cooperation with the position sensing unit 140.

In addition, the data storing unit 160 may record the evaluation result data by the detailed behaviors or the detailed features. This data storing unit 160 may be realized as at least one of non-volatile memory devices such as read only memory (ROM), programmable ROM (PROM), erasable programmable ROM (EPROM), electrically erasable programmable ROM (EEPROM) and flash memory, volatile memory devices such as random access memory (RAM), or storing media such as a hard disk drive (HDD) and CD-ROM, but is not limited thereto.

Further, the real-time experience processing device 100 may include at least one memory that stores a program to process user's experience of the evaluation target service or the evaluation target product and a processor that executes the program. For reference, the memory and the processor are not illustrated in FIG. 2.

According to the execution of the program, the processor may perform the step of transmitting query data including the experience evaluation indicator for the evaluation target service or the evaluation target product to the terminal device of the user, the step of receiving, from the terminal device, reply data input by the user through the terminal device in response to the query data, and the step of generating evaluation result data for the evaluation target service or the evaluation target product based on the reply data. Herein, the transmitting of the query data may transmit the query data by a series of detailed behaviors consisting of the evaluation target service or detailed features consisting of the evaluation target product, and the generating of the evaluation result data may generate evaluation result data based on the reply data received by the detailed behaviors or the detailed features.

Figure 6:
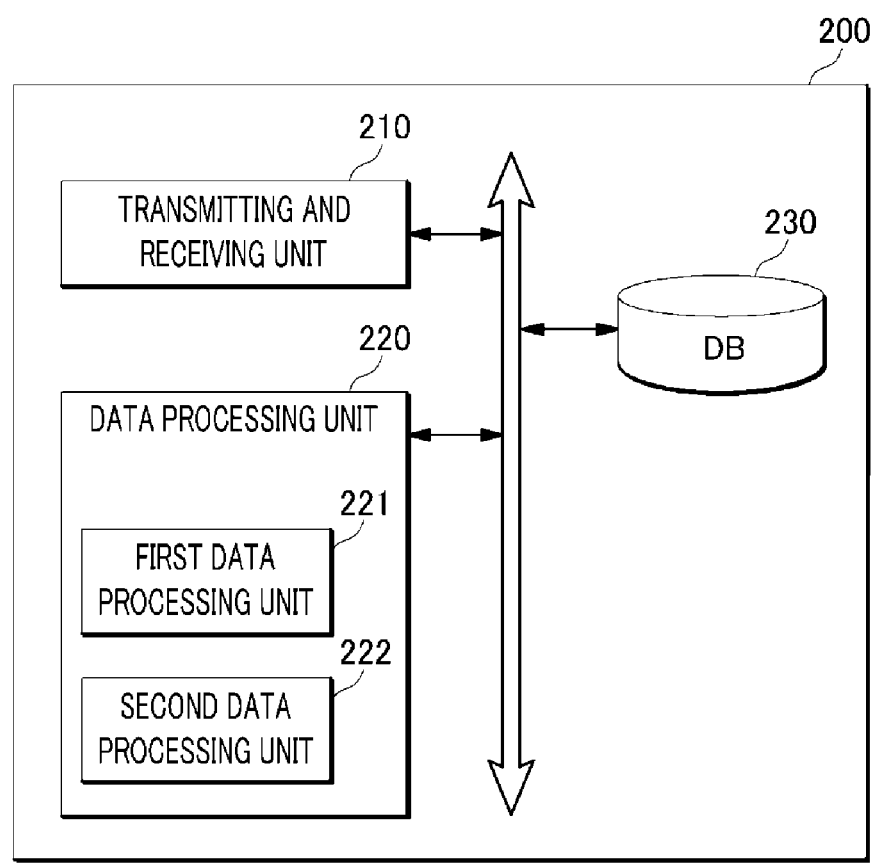
FIG. 6 is a block diagram showing a real-time experience analyzing server in accordance with an example embodiment.

Meanwhile, FIG. 6 is a block diagram showing the real-time experience analyzing server in accordance with an example embodiment.

The server 200, which analyzes user's experience of the certain evaluation target service or the certain evaluation target product, as suggested in the example embodiments includes a transmitting and receiving unit 210, a data processing unit 220 and a database 230, and transmits and receives various data with the user experience processing terminal device 100.

The transmitting and receiving unit 210 transmits query data including an experience evaluation indicator for an evaluation target service or an evaluation target product to the user terminal device 100, and receives, from the terminal device 100, reply data input by a user in response to the query data through the terminal device 100. Especially, the transmitting and receiving unit 210 transmits the query data by a series of detailed behaviors constituting the evaluation target service or detailed features constituting the evaluation target product. Here, the series of detailed behaviors or the detailed features may be preset differently depending on a type of the evaluation target service or the evaluation target product, and may vary depending on user's position information or progress information. Additionally, the query data could have been prepared by applying a quantitative material extracting method to metadata collected in advance in a multiple number of terminal devices. The query data and the experience evaluation indicator capable of optimally evaluating user's experience information regarding the certain evaluation target service or the certain evaluation target product could have been selected in advance in the manner that characteristics or nature of the service (or product) is extracted according to a type of the evaluation target service or the evaluation target product, and metadata are automatically classified depending on various criteria.

In addition, the transmitting and receiving unit 210 may identify the progress state of each detailed behavior according to user's position information or progress information within the space where the evaluation target service is performed, and transmit the query data to the terminal device 100 at the time that each detailed act is finished.

The data processing unit 220 generates evaluation result data for the evaluation target service based on the reply data delivered from the transmitting and receiving unit 210. Especially, the data processing unit 220 generates the evaluation result data based on the reply data received by the detailed behaviors or the detailed features.

Specifically, the query data transmitted to the terminal device 100 through the transmitting and receiving unit 210 may include at least one experience evaluation indicator. In this case, the data processing unit 220 may generate the evaluation result data based on the reply data corresponding to the transmitted query data, and the evaluation result data may include detailed evaluation result data for each experience evaluation indicator according to sequential flow of the detailed behaviors or correlation of the detailed features. The transmitting and receiving unit 210 may transmit the detailed evaluation result data to the terminal device 100 so as to enable the generated detailed evaluation result data to be output to a user in the terminal device 100.

More specifically, the data processing unit 220 may generate the evaluation result data to include an average value and standard deviation data for user's evaluation results for each experience evaluation indicator.

Or, the data processing unit 220 may generate the evaluation result data to be displayed in the terminal device 100 in the Spider Map manner that the detailed evaluation result data are present by connected lines according to preset criteria by each of the detailed behaviors or each of the detailed features.

Or, the data processing unit 220 may generate the evaluation result data to be displayed in the terminal device 100 in the Color Code manner that the detailed evaluation result data have difference in color according to preset criteria by each of the detailed behaviors or each of the detailed features.

Furthermore, the data processing unit 220 may include a first data processing unit 221 and a second data processing unit 222, and each of the first and second data processing units 221, 222 may separate and process evaluation result data for a provider of the evaluation target service or the evaluation target product, and evaluation result data for a customer of the evaluation target service or the evaluation target product.

That is, the first data processing unit 221 may generate provider evaluation result data based on first reply data received from a terminal device of a provider of the evaluation target service or the evaluation target product among the reply data, and generate customer evaluation result data based on second reply data received from a terminal device of a customer of the evaluation target service or the evaluation target product among the reply data. As a result, it is possible to analyze the evaluation target service or the evaluation target product from various perspectives.

Further, the database 230 may record the detailed evaluation result data by the detailed behaviors or the detailed features. As described above, the database 230 may be realized in the inside of the real-time experience analyzing server 200 or separately outside the real-time experience analyzing server 200. In this case, the above-described data processing unit 220 may combine additional reply data received from the transmitting and receiving unit 210 with the detailed evaluation result data recorded in the database 230 to update the detailed evaluation result data. Accordingly, the detailed evaluation result data can be collected in an enormous amount, and the quality of the detailed evaluation result data can be gradually improved.

As described above, since the user experience processing terminal device suggested in the example embodiments can schematize and output, as an experience journey map, the evaluation result data that have been processed by services stages/domains or individually/integrally, it may be utilized in various fields such as consumer research, experience design research, and service design research. In addition, experience of the certain evaluation target service or the certain evaluation target product can be discriminated by the detailed behaviors or the detailed features unlike the conventional methods, and can be represented in various manners from various interested parties' perspectives.

Figure 7:
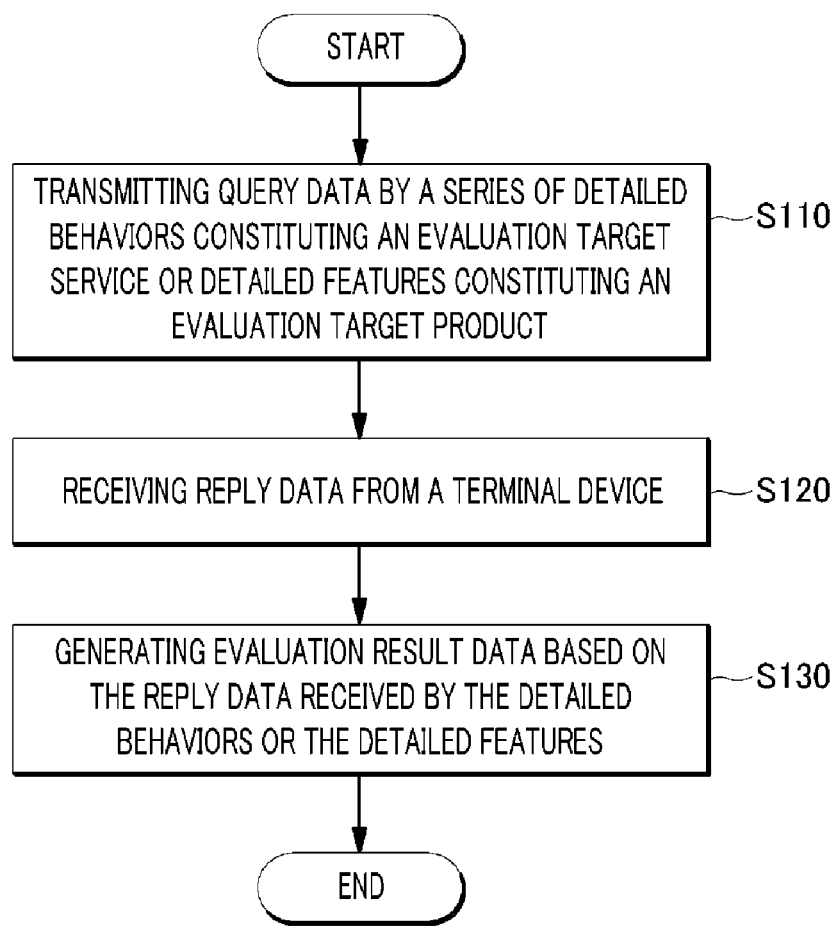
FIG. 7 is a flow chart of a real-time experience analyzing method in accordance with an example embodiment.

Meanwhile, the method that enables the experience analyzing server 200 to analyze user's experience of the certain evaluation target service or the certain evaluation target product in real time in accordance with an example embodiment is described with reference to FIG. 7. FIG. 7 is a flow chart of a real-time experience analyzing method in accordance with an example embodiment.

First, the real-time experience analyzing server 200 transmits query data including an experience evaluation indicator for a certain evaluation target service or a certain evaluation target product to the user's terminal device 100. Especially, the real-time experience analyzing server 200 transmits the query data by a series of detailed behaviors constituting the certain evaluation target service or detailed features constituting the certain evaluation target product (S110).

Figure 8:
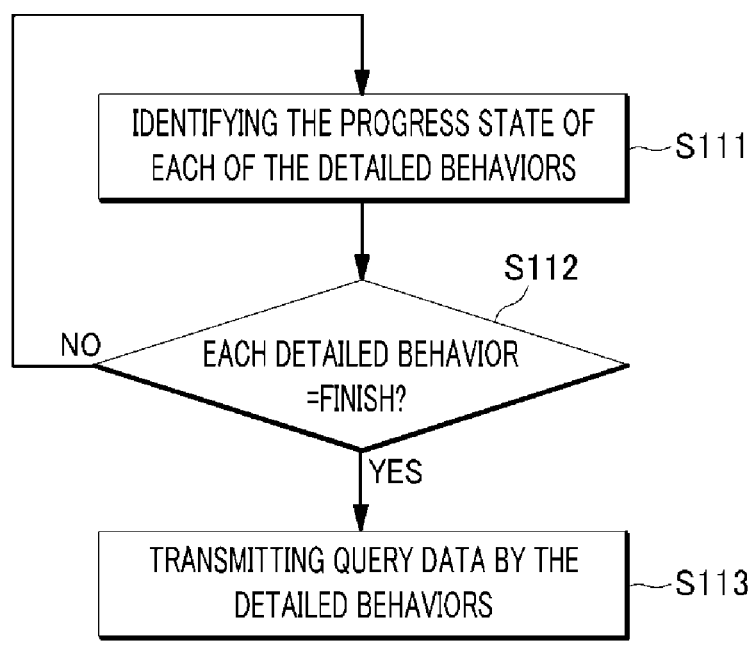
FIG. 8 is a detailed example for a process for transmitting query data among processes illustrated in FIG. 7.

More specifically, the transmitting of the query data (S110) may be implemented as shown in FIG. 8. FIG. 8 is a specific example for the transmitting of the query data among the processes illustrated in FIG. 7.

That is, the progress state of each detailed behavior may be identified according to user's position information or progress information within a space where the certain evaluation target service is performed (S111). While checking whether the corresponding detailed behavior has been finished (S112), the real-time experience analyzing server 200 may transmit the query data for the corresponding detailed behavior to the terminal device 100 at the time of finish of the corresponding detailed behavior (S113).

Figure 9:
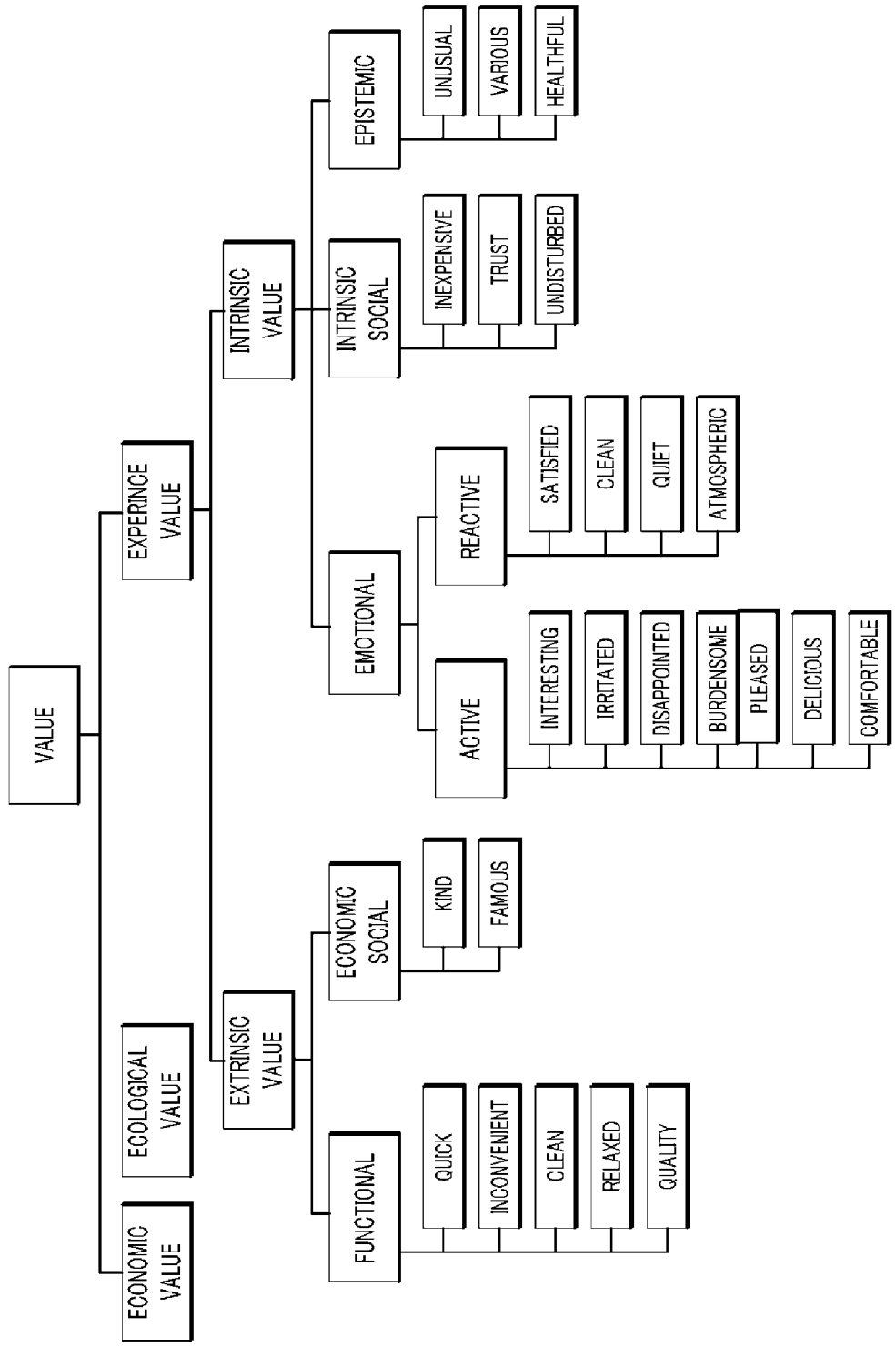
FIG. 9 shows a tree structure of an example for an experience evaluation indicator within query data.

In this case, the query data may include at least one experience evaluation indicator, which varies depending on a type of the evaluation target service or the evaluation target product. The experience evaluation indicator may be selected as shown in FIG. 9, and is not limited thereto. FIG. 9 shows a tree structure of each example for the experience evaluation indicator within the query data. FIG. 9 relates to experience evaluation indicators regarding a service within a restaurant, and some of the experience evaluation indicators are selected to be included in the query data.

For reference, the query data may be implemented in the manner of marking a score of a scored check list or the survey manner. In this case, items of the check list or the survey have been analyzed in advance while reflecting user's experience in real time so as to obtain optimum results, and are optimum to obtain reply data useful as base materials for a consumer pattern or a service improvement direction.

More specifically, the real-time experience analyzing server 200 may implement experience information classification/analysis programs or interview in order to extract general user experience information for each service or product, prior to implementing experience evaluation on various services or products. A process for classifying the recorded user experience information through a computer-program-based language material processing method and an experience value classification system. Through these processes, a keyword experience word is finally selected and used as a base material for an experience evaluation indicator.

Subsequently, the real-time experience analyzing server 200 receives, from the terminal device 100, the reply data input by a user in response to the query data through the terminal device 100 (S120).

Figure 10:
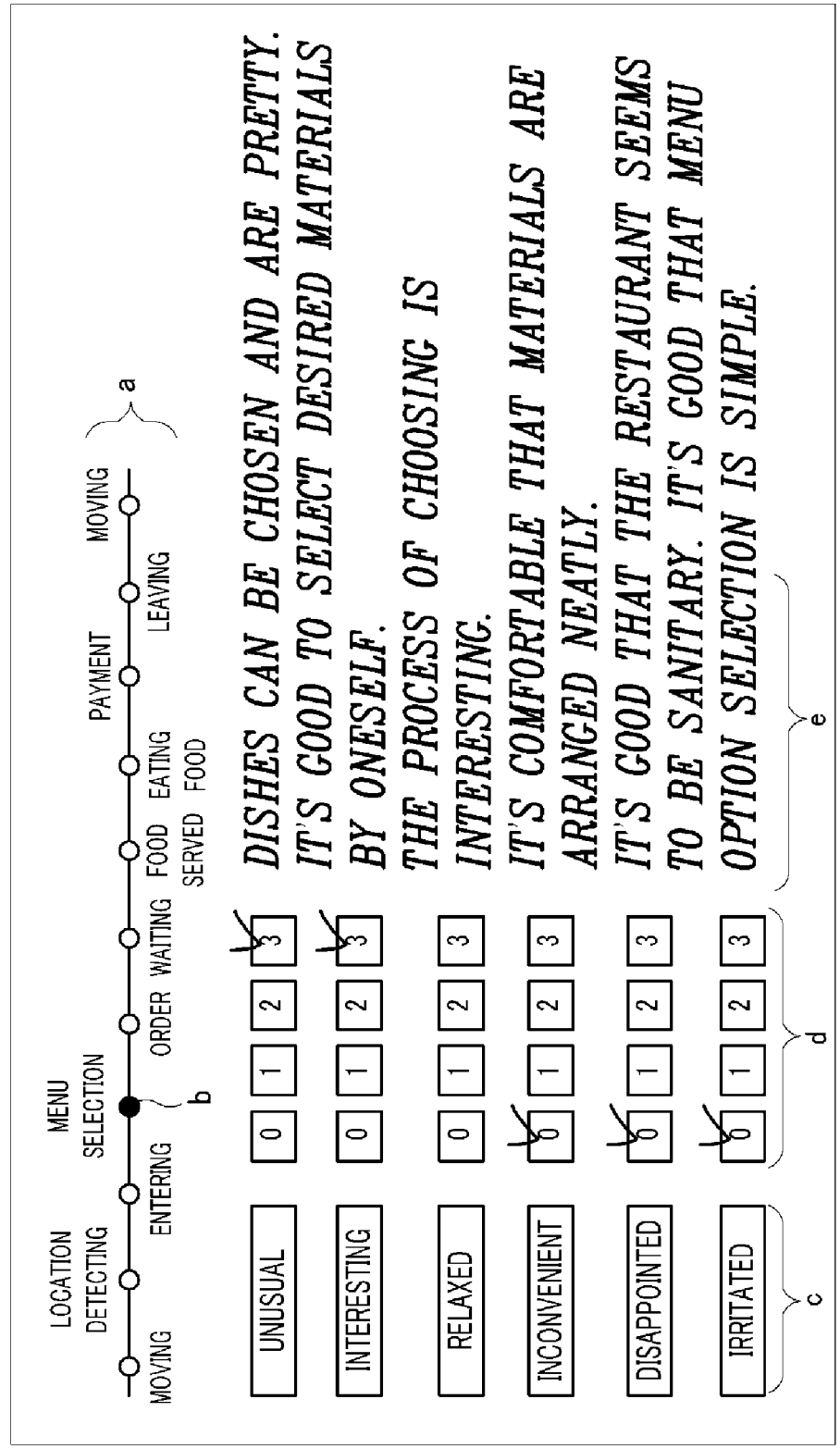
FIG. 10 shows an example for reply data for a service within a restaurant.

FIG. 10 shows an example for reply data for a service within a restaurant. Among a series of detailed behaviors (a) constituting the service within the restaurant, query data for a menu selecting stage (b) may include a multiple number of experience evaluation indicators (c), a scored check list (d), and an opinion writing area (e). In response, a user may select any one of 0, 1, 2, and 3 according to each of the experience evaluation indicators (c) as one example for the reply data, and write short opinion in the opinion writing area (e) as another example for the reply data.

Subsequently, the real-time experience analyzing server 200 generates evaluation result data for the certain evaluation target service or the certain evaluation target product based on the reply data received by the detailed behaviors or the detailed features (S130).

Specifically, the generating of the evaluation result data (S130) may discriminate and generate provider evaluation result data and consumer evaluation result data. That is, the real-time experience analyzing server 200 may generate the provider evaluation result data based on first reply data received by the detailed behaviors or the detailed features from a terminal device of a provider of the evaluation target service or the evaluation target product among the reply data. In addition, the real-time experience analyzing server 200 may generate the customer evaluation result data based on the second reply data received by the detailed behaviors or the detailed features from a terminal device of a customer of the evaluation target service or the evaluation target product among the reply data.

In addition, the generating of the evaluation result data (S130) may generate the evaluation result data to include detailed evaluation result data for each of the experience evaluation indicators according to sequential flow of the detailed behaviors or correlation of the detailed features.

More specifically, the generating of the evaluation result data (S130) may be implemented as in the example described below.

For example, the real-time experience analyzing server 200 may generate the evaluation result data or the detailed evaluation result data to include an average value and standard deviation data for user's evaluation results for each of the experience evaluation indicators.

Figure 11:
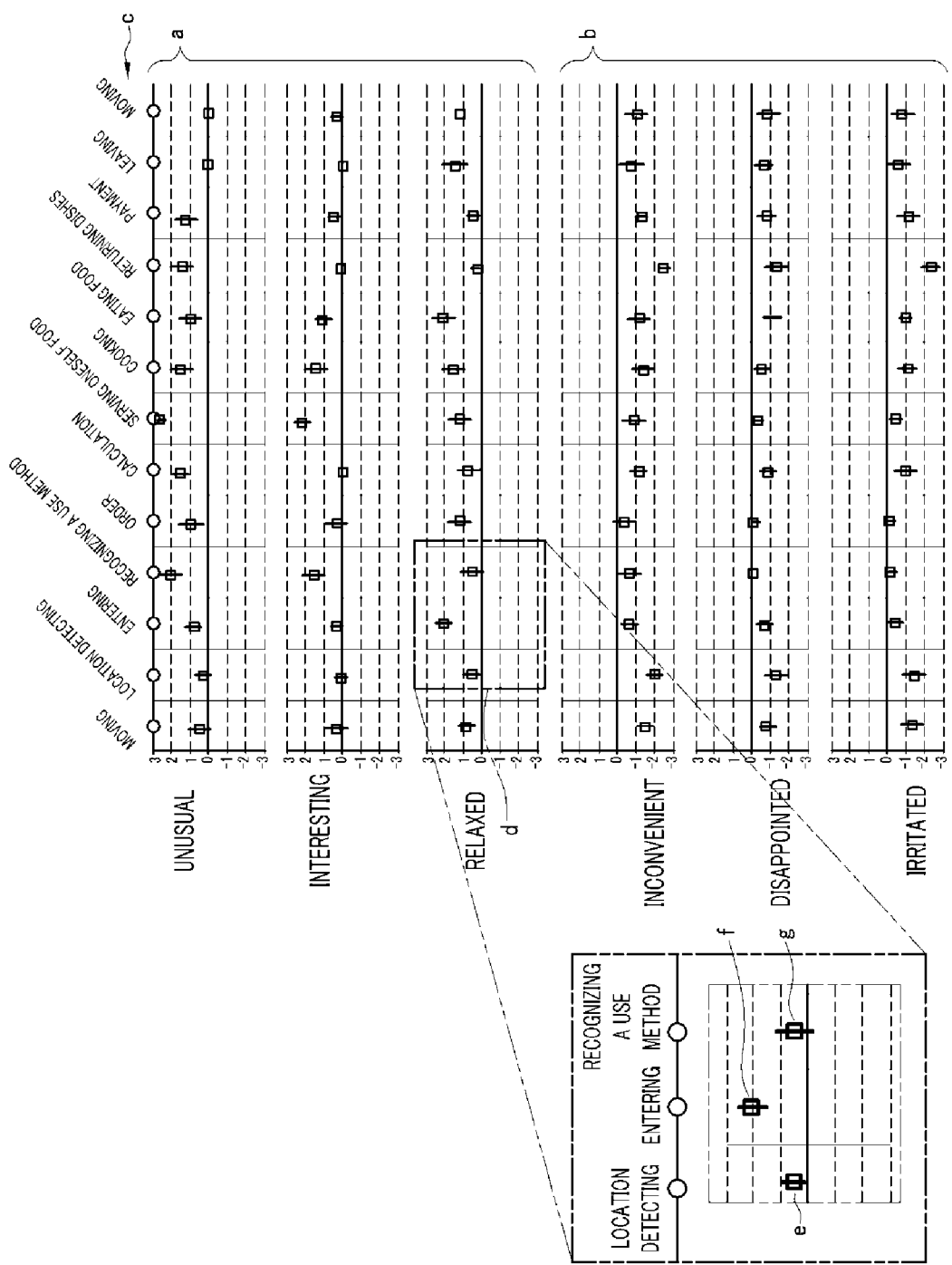
FIG. 11 shows an example for an average value and standard deviation data for evaluation results for a service within a restaurant.

FIG. 11 shows an example for an average value and standard deviation data for evaluation results for a service within a restaurant. An experience evaluation indicator for the service within the restaurant may include a positive indicator (a) and a negative indicator (b), and the average value and the standard deviation data may be displayed by a series of detailed behaviors (c) constituting the service within the restaurant. When specifically reviewing (d) part of the indicator of relaxed, a user can easily identify that an average value (a square figure) for an entering stage (f) is higher than an average value (a square figure) for a location detecting stage (e) and a use method recognizing stage (g). Simultaneously, the user can also identify standard deviation according to length of the straight line illustrated overlapping with the average value (the square figure). Through this standard deviation, it is possible to identify difference in evaluation among users with respect to each experience evaluation indicator or evaluation distribution.

For another example, the real-time experience analyzing server 200 may generate the evaluation results data to be displayed in the Spider Map manner that the detailed evaluation result data are present by connected lines according to preset criteria by each detailed behavior or each detailed feature.

Figure 13:
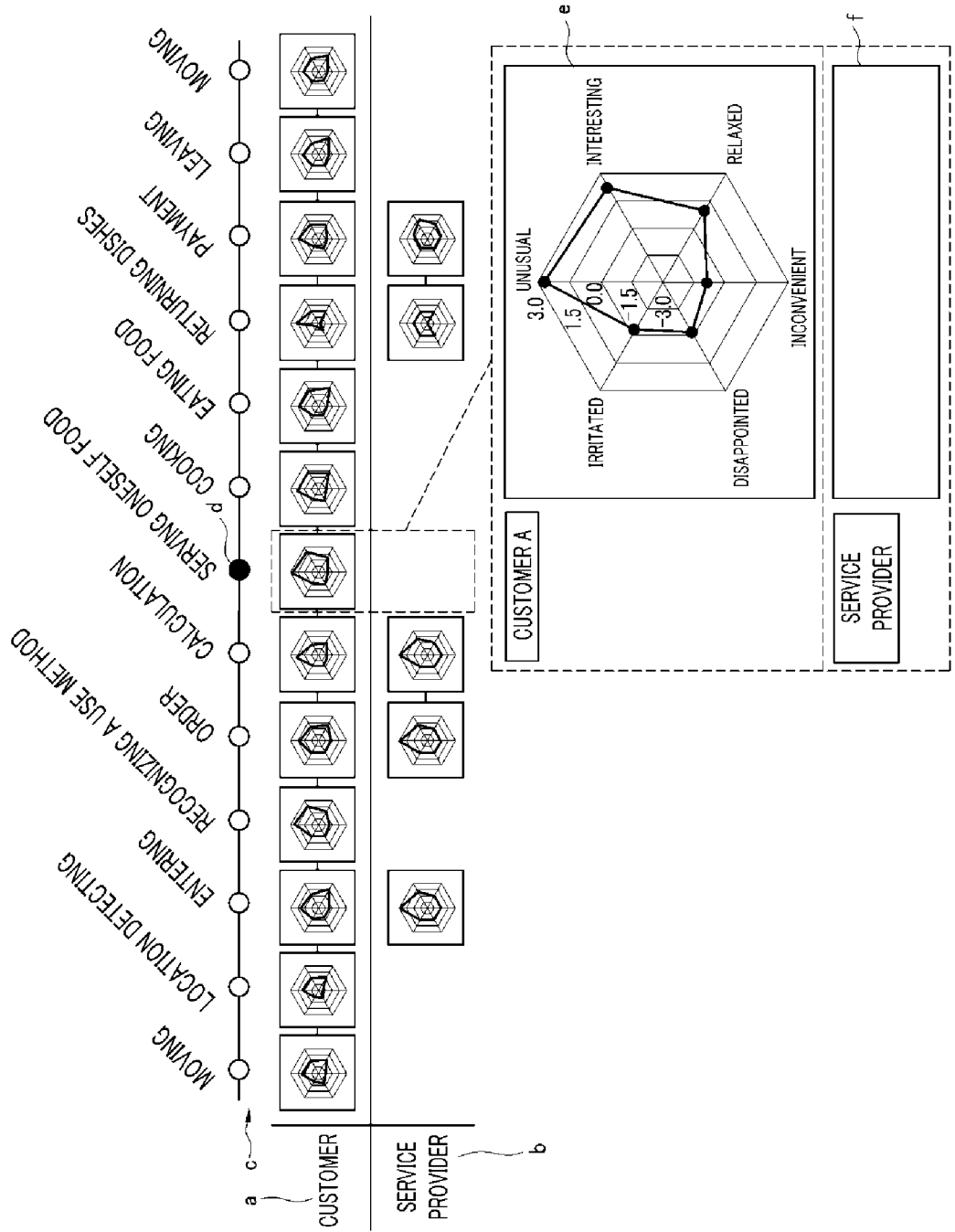
FIG. 13 shows displaying evaluation result data for a service within a restaurant in the Color Code manner.

FIG. 13 shows displaying evaluation result data for a service within a restaurant in the Spider Map manner. The evaluation result data for the service within the restaurant may be discriminated into customer evaluation result data (a) and provider evaluation result data (b) to be displayed through (e) the Spider Map method. The Spider Map method (e) enables evaluation results for a multiple number of experience evaluation indicators to be easily shown at a glance, and as one is far away from the center of the Spider Map, it has a high value for the corresponding experience evaluation indicator. Among the series of detailed activities constituting the service within the restaurant (c), with respect to the stage of serving oneself food (d), customers relatively highly evaluates positive indicators such as unusual, interesting, and relaxed, and relatively lowly evaluates negative indicators such as inconvenience, disappointment and irritation. Since there are no provider evaluation result data (a) for the stage of serving oneself food (d), no resulting Spider Map (f) appears.

For another example, the real-time experience analyzing server 200 may generate the evaluation result data such that the detailed evaluation result data are displayed in the Color Code manner that the detailed evaluation result data have difference in color according to preset criteria by each detailed behavior or each detailed feature.

Figure 12:
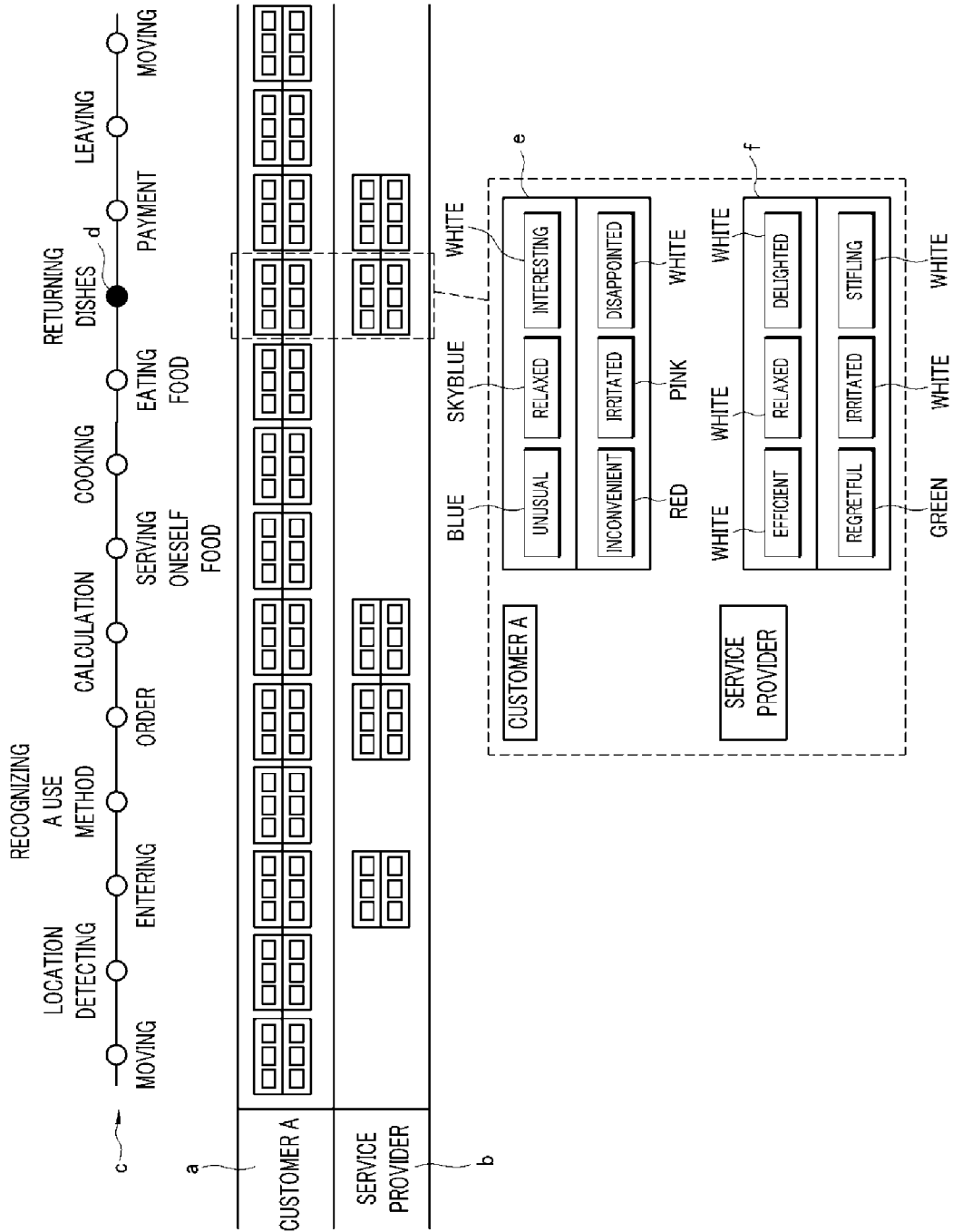
FIG. 12 shows displaying evaluation result data for a service within a restaurant in the Spider Map manner.

FIG. 12 shows displaying the evaluation result data for the service within the restaurant in the Color Code manner. The evaluation result data for the service within the restaurant may be discriminated into the customer evaluation result data (a) and the provider evaluation result data (b) to be displayed through the Color Code manner (e, f). Among the series of detailed activities constituting the service within the restaurant (c), with respect to the stage of returning dishes (c), the following result is displayed in the Color Code manner: Customer A has selected the indicators of unusual (blue), interesting (sky blue), inconvenient (red), and irritated (pink), and a service provider has selected the indicator of regretful (green). The white indicators are ones that have not been selected by users.

Figure 14:
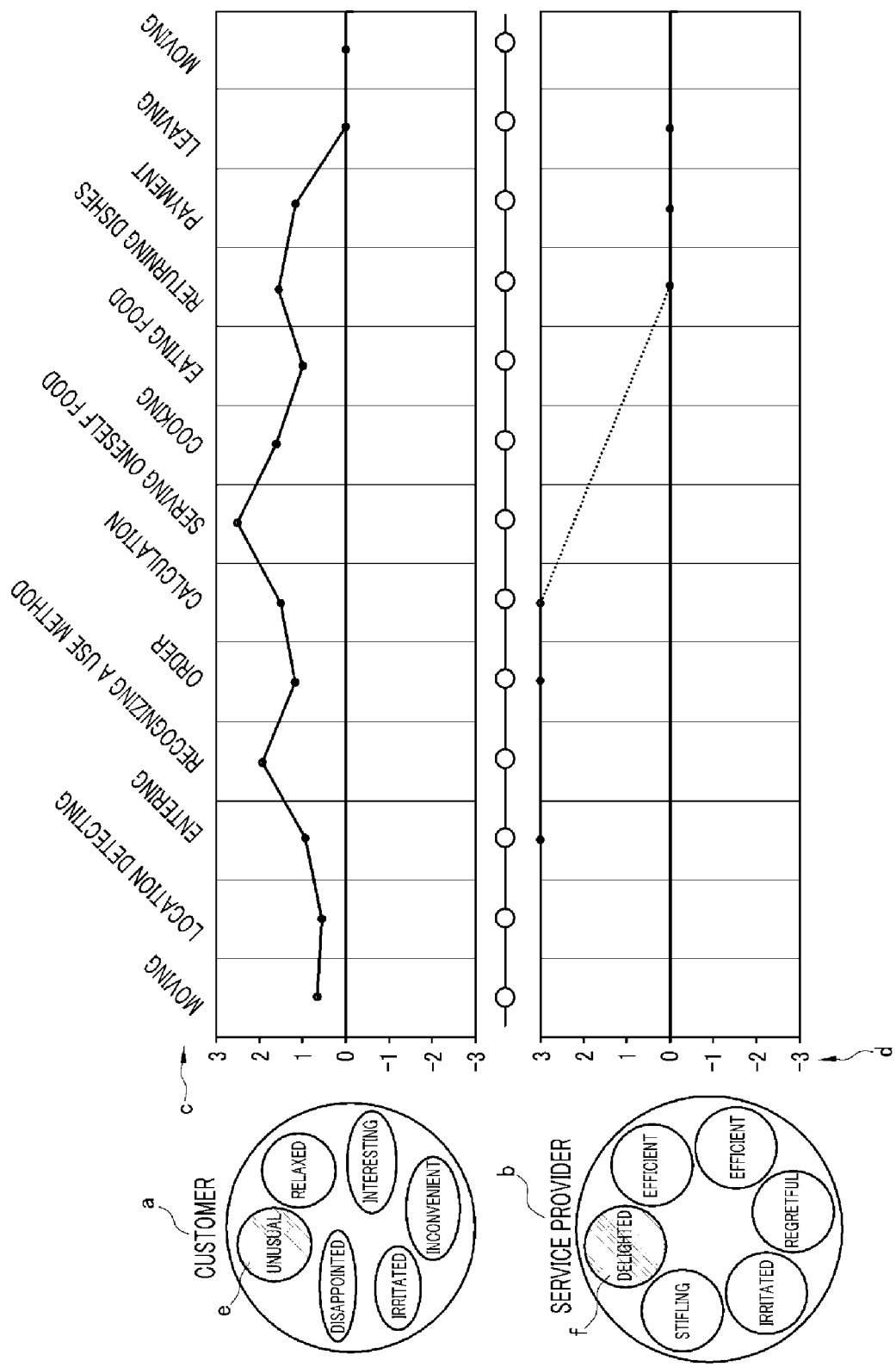
FIG. 14 shows displaying evaluation result data for a service within a restaurant based on any one of a multiple number of experience evaluation indicators.

For still another example, the real-time experience analyzing server 200 may generate the evaluation result data to be displayed in the form illustrated in FIG. 14. FIG. 14 shows displaying the evaluation result data for the service within the restaurant based on any one of a multiple number of experience indicators. The evaluation result data for the service within the restaurant may be discriminated into customer evaluation result data (a) and provider evaluation result data (b). With respect to the series of detailed behaviors constituting the service within the restaurant (c), evaluation result data may be generated such that customers' evaluation results and provider's evaluation results for a certain indicator (e) can be separately displayed. When identifying the evaluation result data in the terminal device 100, a user may refer to numerals (d) appearing in a longitudinal axis.

Additionally, the real-time experience analyzing server 200 may transmit the detailed evaluation result data to the user's terminal device 100 such that the generated detailed evaluation result data are output through the screen of the terminal device 100. By identifying the evaluation result data that are output in real time, a user can feel satisfied and trust with the fact that his/her experience information is being effectively used.

Furthermore, the real-time experience analyzing server 200 may record the detailed evaluation result data by the detailed behaviors or the detailed features in the database 230. When reply data are additionally received from the user's terminal device 100, the additional reply data and the recorded detailed evaluation result data may be subject to a combining process. Through the combining process, the recorded detailed evaluation result data can be continuously updated.

As described above, the real-time experience analyzing system and method in accordance with the example embodiments can draw a wide scope of and various types of experience information by processing user experience information related to a selected context through a qualitative material extracting method upon context-specific experience information processing. Further, query data can be generated based on pre-selected keywords by using a theoretical frame like a computer-programmed experience structure system (automatic classification/selection works) and a statistics technique based on reply from unspecific individuals. Further, customers and providers can quantitatively evaluate query data received through terminal devices, and the real-time experience analyzing server can analyze and schematize the evaluation result data by the detailed behaviors or the detailed features from various perspectives.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A real-time experience evaluation and analyzing method of operating a user interface for providing an evaluation of a user's experience of a target service or a target product, the method comprising:
    transmitting, by a real-time experience analyzing server, query data for an evaluation target service or an evaluation target product, to an interface,
    wherein the transmitting of the query data comprises:
        concurrently informing, by the interface, a sequence of activities of the evaluation target service, and in response to detecting that an activity among the sequence of activities is completed by the user, informing a portion to receive feedback from the user about the activity concurrently with the informed sequence of activities of the evaluation target service, or
        concurrently informing, by the interface, a series of features of the evaluation target product, and in response to detecting that an activity associated with a feature among the series of features is completed by the user, informing a portion to receive feedback from the user about the feature concurrently with the informed series of features of the evaluation target product;
    receiving, by the real-time experience analyzing server, reply data input by the user through the portion to receive feedback from the user about the activity or through the portion to receive feedback from the user about the feature, in response to the query data; and
    generating, by the real-time experience analyzing server, evaluation result data for the evaluation target service or the evaluation target product based on the reply data,
    wherein the query data includes experience evaluation indicators, and the generating of the evaluation result data comprises generating the evaluation result data for each of the experience evaluation indicators according to a flow of the sequence of activities or a correlation of the series of features.

2. The method of claim 1, wherein the transmitting of the query data comprises:
    identifying a progress state of the activities according to progress information in an environment where the evaluation target service is performed; and
    transmitting the query data at a time of finishing the activities.

3. The method of claim 1, further comprising:
    transmitting the evaluation result data to the interface to enable the evaluation result data to be output to the user; and
    recording the evaluation result data by the activities or the features so as to update the evaluation result data through a combining process when the reply data are additionally received.

4. The method of claim 1, wherein the generating of the evaluation result data comprises generating the evaluation result data to include an average value and standard deviation data for evaluation results for each of the experience evaluation indicators.

5. The method of claim 1, wherein the generating of the evaluation result data comprises:
    displaying the evaluation result data in a Spider Map so that the evaluation result data are present by connected lines according to preset criteria of the activities or the features, or
    displaying the evaluation result data in a Color Code so that the evaluation result data have different colors according to the preset criteria of the activities or the features.

6. The method of claim 1, wherein the generating of the evaluation result data comprises:
    generating provider evaluation result data based on first reply data received from a terminal device of a provider of the evaluation target service or the evaluation target product among the reply data; and
    generating customer evaluation result data based on second reply data received from a terminal device of a customer of the evaluation target service or the evaluation target product among the reply data.

7. A real-time experience evaluation and analyzing computer server for operating a user interface for providing a survey, the computer server comprising:
- a transmitting and receiving unit configured to transmit, to an interface, query data for an evaluation target service or an evaluation target product, wherein the interface is configured to:
  - concurrently inform a sequence of activities of the evaluation target service, and in response to detecting that an activity among the sequence of activities is completed by a user, inform a portion to receive feedback from the user about the activity concurrently with the informed sequence of activities of the evaluation target service, or
  - concurrently inform a series of features of the evaluation target product, and in response to detecting that an activity associated with a feature among the series of features is completed by the user, inform a portion to receive feedback from the user about the feature concurrently with the informed series of features of the evaluation target product, and
- receive, from the interface, reply data input by the user through the portion to receive feedback from the user about the activity or through the portion to receive feedback from the user about the feature, in response to the query data; and
- a data processing unit configured to generate evaluation result data for the evaluation target service or the evaluation target product based on the reply data,
- wherein the query data includes experience evaluation indicators, and the data processing unit is further configured to generate the evaluation result data for each of the experience evaluation indicators according to a flow of the sequence of activities or a correlation of the series of features.

8. The real-time experience evaluation and analyzing computer server of claim 7, wherein the transmitting and receiving unit is further configured to identify a progress state of the activities according to progress information including position information of the user within a space where the evaluation target service is performed, and transmit the query data at a time of finishing the activities.

9. The real-time experience evaluation and analyzing computer server of claim 7,
- wherein the transmitting and receiving unit is further configured to transmit the evaluation result data to the interface to enable the evaluation result data to be output to the user.

10. The real-time experience evaluation and analyzing computer server of claim 9, further comprising a database configured to record the evaluation result data by the activities or the features,
- wherein the data processing unit is further configured to combine additional reply data received from the transmitting and receiving unit with the evaluation result data recorded in the database to update the evaluation result data.

11. The real-time experience evaluation and analyzing computer server of claim 9, wherein the data processing unit is further configured to generate the evaluation result data to include an average value and standard deviation data for evaluation results for each of the experience evaluation indicators.

12. The real-time experience evaluation and analyzing computer server of claim 9, wherein the data processing unit is further configured to:
- display the evaluation result data in a Spider Map so that the evaluation result data are present by connected lines according to preset criteria of the activities or the features, or
- display the evaluation result data in a Color Code so that the evaluation result data have different colors according to the preset criteria of the activities or the features.

13. The real-time experience evaluation and analyzing computer server of claim 7, wherein the data processing unit comprises:
- a first data processing unit configured to generate provider evaluation result data based on first reply data received from a terminal device of a provider of the evaluation target service or the evaluation target product among the reply data; and
- a second data processing unit configured to generate customer evaluation result data based on second reply data received from a terminal device of a customer of the evaluation target service or the evaluation target product among the reply data.

14. A computer-implemented real-time experience processing device for providing a user interface for providing a survey, comprising:
- a receiving unit configured to receive query data for an evaluation target service or an evaluation target product from a real-time experience analyzing server;
- an interface configured to:
  - concurrently inform a sequence of activities of the evaluation target service, and in response to detecting that an activity among the sequence of activities is completed by a user, inform a portion to receive feedback from the user about the activity concurrently with the informed sequence of activities of the evaluation target service, or
  - concurrently inform a series of features of the evaluation target product, and in response to detecting that an activity associated with a feature among the series of features is completed by the user, inform a portion to receive feedback from the user about the feature concurrently with the informed series of features of the evaluation target product;
- a transmitting unit configured to transmit reply data, input by the user through the portion to receive feedback from the user about the activity or through the portion to receive feedback from the user about the feature, in response to the query data, to the real-time experience analyzing server; and
- a data outputting unit configured to output evaluation result data generated by the real-time experience analyzing server based on the reply data,
- wherein the query data includes experience evaluation indicators, and the data outputting unit is further configured to output the evaluation result data for each of the experience evaluation indicators according to a flow of the sequence of activities or a correlation of the series of features.

15. The real-time experience computer-implemented processing device of claim 14, further comprising a progress sensing unit configured to sense progress information including position information within a space where the evaluation target service is performed,
- wherein the transmitting unit is further configured to transmit the progress information delivered from the progress sensing unit to the real-time experience analyzing server.

16. The real-time experience computer-implemented processing device of claim 14, wherein the real-time experience computer-implemented processing device further comprises a data storing unit configured to record the evaluation result data.

17. The real-time experience computer-implemented processing device of claim 16, wherein the data outputting unit is further configured to output an average value and standard deviation data for evaluation results of each of the experience evaluation indicators within the evaluation result data.

18. The real-time experience computer-implemented processing device of claim 16, wherein the data outputting unit is further configured to output the evaluation result data, and the evaluation result data are informed in a Spider Map manner so the evaluation result data are present by connected lines according to preset criteria, or in a Color Code so that the evaluation result data have different colors according to the preset criteria.

19. The real-time experience computer-implemented processing device of claim 14, wherein the reply data includes first reply data generated when the user is a provider of the evaluation target service or the evaluation target product, and second reply data generated when the user is a customer of the evaluation target service or the evaluation target product, and the data outputting unit is further configured to discriminate and output provider evaluation result data based on the first reply data and customer evaluation result data generated based on the second reply data.

20. The real-time experience computer-implemented processing device of claim 14, wherein the interface is further configured to display a timeline of the sequence of activities of the evaluation target service in which the activity is shown as selected, or inform a list of the series of features of the evaluation target product in which the feature is shown as selected.

21. The real-time experience computer-implemented processing device of claim 20, wherein the interface is further configured to display a list of indicators of emotions associated with the activity, or display a list of indicators of emotions associated with the feature.

22. The real-time experience computer-implemented processing device of claim 21, wherein the interface is further configured to display arrays of scoring indicia respectively corresponding to each of the indicators of emotions associated with the activity, or display arrays of scoring indicia respectively corresponding to each of the indicators of emotions associated with the feature.

* * * * *